3,239,496
METHOD FOR PRODUCING POLYMERIC SALTS OF AMINOALKYLACRYLATES
Myron J. Jursich, Chicago, Ill., assignor to Nalco Chemical Company, Chicago, Ill., a corporation of Delaware
No Drawing. Filed Sept. 24, 1962, Ser. No. 225,830
6 Claims. (Cl. 260—89.5)

The instant invention is concerned with high molecular weight polyester-amine polymeric salts and the method of synthesizing same. More specifically, this invention relates to water-soluble polymeric esters containing neutralized basic amine groups which are produced by novel synthetic methods by which these substances are polymerized to an extent heretofore unattainable. Also, the invention relates to the use of these same high molecular weight polymers as cellulosic additives and particularly paper beneficiators.

It has recently been noted that the activity of certain polymeric chemical treating agents in a variety of commercial and industrial uses is directly dependent upon and proportional to their molecular size. For example, if water-soluble polymeric materials are to be employed for some particular end use, in many instances their additive performances are oftentimes a direct reflection of the extent of their chain length. Yet, on the other hand, it is necessary that this high molecular weight be achieved without sacrifice of linearity of chain length and without destroying the requisite water solubility needed in the particular application. In particular, it is essential that these water-soluble treating agents, while falling within the desired high molecular weight range, have few sites of crosslinking. If the high molecular weight polymer contains any substantial number of crosslinking sites throughout the linear chain, causing a 3-dimensional gel network, the resultant product would become an unusable solid mass, and completely unavailable for its particular role as a process additive.

Efforts to achieve the desired high molecular weight, chain linearity, absence of crosslinking sites and required water-solubility in many given polymers have not been achieved by utilization of known polymerization techniques. Efforts to drive the polymerization reaction to completion by adjustment of one or more variables such as catalyst concentration, and the like have in many cases resulted in only causing gelation and consequent uneconomical discard of the resultant product. In order to achieve high molecular weight of many polymeric substances it has been necessary therefore to discard the old polymerization techniques and devise new and novel routes for producing these polymers. As mentioned above, only when the polymers have been produced in their highest molecular weight state consistent with requisite water-solubility, can their maximum effectiveness as treating agents be realized.

U.S. Patent 2,838,397 and other references point out various uses of polymeric esters containing basic amine groups. For example, these water-soluble esters may be used as cellulosic material additives, and particularly as chemical treating agents to impart certain desired properties to paper materials such as filler retention, dye retention, and the like. However, it has been discovered that by following the polymerization techniques outlined therein or by merely polymerizing these ethylenically unsaturated esters containing an additional amine group, by known solution, bulk, etc., polymerization methods, a barrier to achievement of the desired high molecular weight range is soon reached in every instance. If known polymerization methods are followed, it is impossible to achieve the long chain linearity necessary to such high molecular weight. In particular, it appears that after a certain maximum molecular weight is reached, chain termination of each linear polymeric molecule begins and new polymeric sites are then formed. Thus, within a statistical average, the polymeric substance as a whole has a low molecular weight relative to that desired by the experimenter. Attempts to drive the reaction to completion by excess heating has merely resulted in a product having a substantial number of crosslinks. It is unsatisfactorily viscous due to the number of these 3-dimensional sites, and in many cases has gelled to a solid unusable and unsalable mass.

It would be of benefit to the art if high molecular weight water-soluble polymers having almost essentially complete linearity of chain backbone, with little or no crosslinked sites could be produced in a simple process whereby the polymeric products thereof could be employed with maximum efficiency in various industrial processes such as papermaking and the like. If the desired high molecular weight of these polymers could be reached, their full potential could be realized and they could be most efficiently employed in their chemical treating agent role. Heretofore, while the use of many of these water-soluble polymeric additives has been realized in many processes, their complete potential and most efficient utilization has not been reached due to inability to produce these polymers in their highest molecular weight realizable by theoretical calculations. Only through synthesis of water-soluble polymers having molecular weights as close as possible to such theoretical maximum can they give their best performance in many roles which are directly dependent upon the extent of their linear chain lengths.

It therefore becomes an object in the invention to provide linear polyester salt compositions containing a basic amine group, substituted or unsubstituted, in a higher molecular weight range than heretofore attainable.

Another object of the invention is to provide the above type polymers by means of a special polymerization technique which promotes the achievement of such molecular weight, and yet remains relative simple, involving no special equipment or long and tedious multi-process steps.

Yet another object of the invention is to provide high molecular weight polyester amino salt compositions which show superior efficiency in their use as cellulosic treating agents, and particularly in their use as paper additives in promoting inorganic mineral filler retention, fiber fines retention, dye retention, and drainage improvement when the treated paper pulp is formed into a wet mat prior to its being dried a usuable sheet.

A still further object of the invention is to provide linear high molecular weight polyester amine salts by a special polymerization process whereby high molecular weight, as shown by viscosity measurements is achieved, but yet, the extent of polymerization at any desired point may be checked by means of use of a group of substances known as chain stoppers. Thus, while the desired high molecular weight is reached, no further viscosity build-up is noted and the polymers remain stable over long periods of time without becoming excessively viscous or gelling irreversibly to an unusable mass.

In accordance with the invention certain high molecular weight water-soluble polymer salts have been prepared by a novel polymerization technique, which salts contain repeating monomeric units of the following structure:

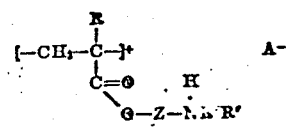

where R is either hydrogen, methyl or ethyl, Z is

—$(CH_2)_2$—, —$(CH_2)_3$— or —$CH_2CH(CH_3)$— and R' is either hydrogen or a lower alkyl radical. A is the anion of an ionizable acid capable of salt formation. These polymeric salts produced within a higher molecular weight range than heretofore possible, all have viscosities of at least 8,000 centipoises when measured as aqueous solutions containing 25% by weight of solid polymer. Due to their extremely high molecular weight, these polymeric salts when used as additives to certain cellulosic materials and particularly to paper pulp, perform their particularly desired role with highly superior efficiency in these end uses. Only through a careful following of the procedure below can one achieve the higher molecular weight concomitant with requisite water-solubility. By the term "water-soluble" is meant capability of solution or dispersion of the polymers in aqueous media in amounts at least sufficient to allow the polymers to be available for their intended use in dispersed or soluble form. The term "lower alkyl" is meant to include those aliphatic hydrocarbon radicals in branched or linear chain structure having six or less carbons and preferably containing three or less carbon atoms.

Broadly speaking, the above type polyesteramine high molecular weight polymeric salts may be prepared in a unique process generally including the steps of forming a reaction material comprising an aqueous solution of an ethylenically unsaturated monomeric salt corresponding to the above structural formula, bringing the reaction mixture to boiling under reduced pressure to remove dissolved oxygen from the reaction mixture, adding a polymerization catalyst to the reaction mixture and then completing the polymerization by heating the monomeric salt solution in the presence of an inert gas until the viscosity of the aqueous polymeric solution reaches at least 8,000 centipoises measured as an aqueous solution containing 25% solids by weight, at 77° F.

PREPARATION OF POLYMERS

The first step of the process involves preparation of salts of the ethylenically unsaturated monomeric ester compounds containing a basic amino group. Representative monomers which may be employed as starting materials may be chosen from among the following; dimethylaminoethyl acrylate and methacrylate, 3-dimethyl- or 3-diethylaminopropyl acrylate and methacrylate, 2-dimethylaminoisopropyl acrylate and methacrylate, dimethylaminoethyl ethyl acrylate, diethylaminoethyl ethyl acrylate, 3-dimethyl- or 3-diethylaminopropyl ethyl acrylate, 2-dimethylaminoisopropyl ethyl acrylate and t-butylaminoethyl methacrylate or acrylate.

To any of the above or similar ester-amine monomers is added an inorganic or organic acid capable of salt formation with the amine group of the ester-amine monomer. These acids may include hydrochloric acid, sulfuric acid, phosphoric acid, formic acid, acetic acid, etc. Preferred among these due to cost, availability and easy reactivity with the basic amine group is acetic acid. It is preferred that at least one mole of inorganic or organic acid be added for each mole of monomer reactant. More preferably, an excess of around 10% or more is preferred in order to effect complete amine neutralization and salt formation.

Both the acid and monomer base are added to water in order to form an aqueous concentrated solution of polymerizable salt. The acid and monomer base may be added to the water in any sequence and the resultant reaction mixture is then agitated in order to allow the ingredients to come in necessary contact with each other and consequently allow complete salt formation. Normally, the pH of the reaction mixture at this time falls between 4.0–7.0, and usually falls within the range of 5–6.

The above concentrated solutions normally contain from 10 to 40% by weight of solid reactants, that is solids calculated on the basis of the salt weight including both acid and monomeric base. More preferably the polymerizable aqueous solutions contain from 15% to 35% by weight of monomeric salt. The most preferred concentrated aqueous monomeric solutions contain 20–30% by weight of salt.

After complete salt formation has been effected by gentle agitation, the reaction mixture is then warmed and placed under sufficient vacuum at any desired temperature to visibly bring the reaction mixture solution to a boil. Preferably, the reaction mixture is heated to above about 40° C. and more preferably between 40° C. and 80° C. The solution is boiled for a very short time, ordinarily between 1 and 25 minutes. It has been determined that the above step forms one of the essential parts of the process and is necessary in order to thereby remove dissolved oxygen which, if allowed to remain during the subsequent polymerization steps, will greatly inhibit the reaction and lead to undesired low molecular weights of the final polymer. Numerous experiments have shown that omission of this step results in final polymer products with low molecular weights and low activity as process additives. Only by removing the dissolved oxygen in the reaction mixture can one achieve the desired high product viscosity and consequent high molecular weight in conjunction with excellent product reproducibility. Moreover, the above aims cannot be achieved by merely purging air from the vessels containing the reaction mixture, by means of an inert gas. It is necessary to remove dissolved air containing oxygen from the reaction mixture itself. Tolerance of the ester-amine monomeric salts for oxygen in the instant polymerization system is extremely low. Omission of purging of dissolved oxygen in the reaction mixture in many instances leads to a situation where polymerization cannot even be initiated, much less be continued to its final desired extent. The injurious presence of oxygen may be overcome to some extent via polymerization initiation by increasing the concentrations of catalyst used in the polymerization. In order to achieve this however, the quantities of catalyst necessary were found to be so great that the number of chain initiation sites were innumerably increased, leading to products of overall low molecular weight, and a number of polymeric chains having a low order of linear chain lengths.

After the air containing oxygen has been removed from both the reaction mixture itself and the reaction system, a source of inert gas is introduced slowly into the reactor with simultaneous slow removal of vacuum until atmospheric pressures are again reached. Again, it is essential that no air reach the polymerization system, and introduction of oxygen at this time or prior to completion of the polymerization will have the above outlined deleterious effect of inhibiting chain length and consequent high molecular weight. During the entire period of introduction of inert gas, the system is held at a temperature of between about 40° C. and 80° C. and preferably between 40° C. and 50° C. Any source of inert gas may be used in preventing oxygen from entering into the system. It is essential that these inert gases contain only trace amounts, if any, of oxygen in the order of parts per million and preferably below about 20 p.p.m. oxygen. A preferred source of inert gas with regard to availability, low cost, complete incombustibility, and excellent activity in prevent oxygen from entering into the system is prepurified nitrogen. A typical sample of this nitrogen contains about 8.0 p.p.m. of oxygen.

While a head of inert gas is kept over the reaction mixture, catalyst is then added to the solution. Conventional peroxidic oxidizing agents such as potassium persulfate, hydrogen peroxide and ammonium persulfate may be used as the catalyst in the process of the invention. It is preferred that water-soluble compounds be used for this purpose. The amount of catalyst used in the process can vary from about 0.001 to about 0.2% by weight, based on the weight of the reaction mixture. More preferably, the preferred range of catalyst is from about 0.01 to about 0.1%. Catalyst concentrations above 0.2% will polymerize the monomeric salt solution but resultant products are not as superior as those prepared using amounts of catalyst within the specified range. One of the advantages of the subject process, therefore, is that it provides a means of carrying out polymerization using various amounts of catalyst in relatively small quantities.

In a preferred embodiment of the invention, the polymerization reaction is carried out using a redox type catalytic system. In such a system, the catalyst is activated by means of a reducing agent which in the absence of oxygen immediately produces free-radicals without the use of excessive amounts of heat. One of these reducing agents most commonly used is sodium metabisulfite. Other suitable agents include water soluble thiosulfates, bisulfites, hydrosulfites, reducing salts, such as the sulfates, and metals which are capable of existing in more than one valence state. These metals include cobalt, iron, nickel and copper. The use of a redox initiator system has several advantages, the most important of which is that it is possible to carry out the polymerization at lower temperatures. Heat is not required to decompose the catalyst.

When the above type activators are used in conjunction with a polymerization catalyst in forming the redox type catalytic system, it is preferred that both substances should be added together as aqueous solutions of low concentration. The catalyst activators, when employed, are used in an amount ranging from 0.003 to about 3.0% based on the weight of the reaction mixture and preferably from 0.1 to 3.0%.

Within a short time after addition of either the catalyst alone or the catalyst in conjunction with the activator, polymerization begins to occur. The polymerization reaction is then kept at a temperature of about 40–80° C. and preferably between 40–50° C., for an amount of time ranging from ¼ hour to about 6 hours' duration. Excellent high-molecular weight polymeric salts have been produced using the above temperatures, for times ranging from one hour to about four hours. The reaction progress may be closely traced by periodically taking small samples therefrom and measuring their viscosity.

After the viscosity of a 25% by weight of solids concentrated solution has reached at least 8,000 centipoises measured at 77° F., the polymerization reaction may be terminated. Viscosities of products as high as 100,000 cps. have been reached by following the process techniques outlined herein. When the desired viscosity range has been reached, the polymerization reaction is stopped. In a preferred embodiment of the invention, a "chain stopper" is then added which immediately causes the chain build-up to cease. It has been found that typical chain stoppers contain one or more groups of radicals which act as a free radical "sink" and cause the polymer chain to be terminated when desired. The "chain stoppers" are employed particularly to prevent viscosity to a point beyond practical product utilization or even to the point of gelation. In other words, if the reaction is not ceased, slow polymerization would continue over long periods of time and the products after any substantial length of storage time would become difficult to handle or even completely unusable. On the other hand, if the "chain stopper" is employed, stable samples may be produced lasting for a period of even one year or more. It is therefore greatly preferred to add a "chain stopper" additive in order to terminate the polymerization prior to gel formation. Using these additives, no evidence of viscosity increase is noted once the chain terminator has been added. The amount of chain terminators employed may vary from about 0.01 to about 2.0% based on the weight of the reaction mixture. More preferably, the amount of chain stopper used varies from about .1% to about 0.5% by weight. A preferred "chain stopper" giving excellent polymerization termination results even at relatively low concentrations is ammonium thioglycolate. Other useful chain stoppers are thiophenol, mercaptoethanol, diethyl sulfide, diphenyl disulfide, carbon tetrachloride, butyl chloride, dioxane methyl isobutyl ketone, chlorobenzene and t-butyl mercaptan.

As mentioned above, the concentrations of polymerization catalyst and activator can be varied over wide ranges without going below the desired molecular weight ranges. Table I below shows a series of experiments in which a $(NH_4)_2S_2O_8$ catalyst and $Na_2S_2O_5$ activator concentration was varied while the remainder of the process variants were kept constant. The polymerization was carried out over reaction time of one hour at 45° C.

Viscosity measurements were made on samples having 25% by weight solids and are measured in centipoises at 77° F.

TABLE I

| $(NH_4)_2S_2O_8$ Concentrations, percent | $Na_2S_2O_5$ Concentrations, percent | Viscosity |
|---|---|---|
| 0.00125 | 0.025 | 27,000 |
| 0.0025 | 0.05 | 35,000 |
| 0.005 | 0.10 | 26,000 |
| 0.01 | 0.20 | 28,500 |
| 0.17 | 0.34 | 8,500 |

As discussed above, in initially investigating the variables of the subject process, numerous runs were made in the presence of oxygen, that is, the reaction mixture and polymerization system were not purged of oxygen by vacuum boiling and kept free of oxygen by introduction of inert gas during polymerization. A series of runs were made following the general sequence of steps outlined above with the exception that polymerization was carried out in the presence of air and the reaction mixture was not purged of oxygen. The final products had relatively low viscosities and corresponding low activity as paper additives as prepared by this method exemplifying prior art techniques. The products in a series of experiments had the following viscosities in centipoises measured as 25% concentrated solutions at 77° F.: 2830, 680, 1100, 2340, 710, 1490 and 1545 centipoises respectively. Moreover, the polymers so prepared had a tendency to discolor badly upon standing. On the other hand, high molecular weight polymers were also prepared by following the exact techniques outlined above including the critical step of conducting the polymerization in the absence of oxygen. These products in a series of runs had the following viscosities in centipoises measured at a 25% by solids weight concentrated solution at 77° F.: 10,500; 20,000; 9,600; 12,500; 14,000; 11,000 and 11,400 centipoises respectively. These products in contradistinction to the low molecular weight prior art materials did not color whatsoever and remained water-white and crystal clear even after storage times as much as one year or more.

The following experimental study illustrates preparation of a typical high molecular weight polymer by means of the process of the invention. Five runs were made using the exact reactant charges, catalyst concentrations and reaction times with the only variation being adjustment of temperature during the reaction. During these runs the reaction temperature was varied from 40° C. to 46° C. and the viscosity of the final products varied from 9,600 centipoises to 20,000 centipoises. A typical run is shown below:

*Experiment I*

20.5 pounds of dimethylaminoethyl methacrylate, 82.5 pounds of water and 9.0 pounds of acetic acid were charged to a reactor and thoroughly mixed. The resulting mixture had a pH of 5.5. Reactants were heated to 50–52° C. with steam, and vacuum was then applied slowly at this temperature. Refluxing began to occur at 140 mm. of vacuum and continued over a vacuum range of 110–140 mm. at a pot temperature of 52° C. The vacuum was then adjusted to maintain a surface boil and total reflux in the reactor for approximately 8 minutes. Extra precaution was taken in preventing subsequent introduction of oxygen once it had been removed by vacuum boiling, by introduction of pre-purified nitrogen (8 p.p.m. of oxygen) which was "deadheaded" against all valves to prevent any air leakage into the reactor.

After six minutes of total reflux the pre-purified nitrogen was then introduced into the reactor itself through a sparging tube at 0.5 ft.$^3$/min. At the end of an 8 minute refluxing period the agitation was slightly decreased to prevent the formation of a vortex and the inclusion of air in the reaction mixture. The vacuum was broken slowly with nitrogen over a 5 minute period to prevent any oxygen from entering the system. During the reflux period, 3–4 pounds of distillate were distilled over into a receiver and later replaced with an equivalent amount of water when the polymerization reaction was considered complete.

After the system had reached atmospheric pressure, the temperature of the reactants was adjusted to 45° C. The agitation was again decreased somewhat and 0.2 pound of a 10% solution of sodium metabisulfite was added to the reaction mixture while keeping the pot temperature within a range of 45–47° C. A nitrogen blanket was maintained over the reaction mixture during catalyst addition. The temperature of reaction was maintained at 45° C. for approximately 2 hours after addition of the activated catalyst until the pot sample had a viscosity of 10,500 centipoises. At this point, 4.1 pounds of a 10% aqueous solution of ammonium thioglycolate solution were added and agitated thoroughly with the reaction mixture. The batch was cooled and drummed. Viscosity measurements taken at intervals over a period of 8–9 months showed that the sample had no tendency whatsoever to increase in viscosity.

Efforts were also made to prepare similar high polymeric free base material corresponding to the polyester-amine salts of the invention, but without success. Attempts to polymerize the unneutralized ester amine monomer itself resulted in polymer samples having substantially lower viscosities and molecular weights than the polymer salts prepared as outlined above. Also, neutralization of the formed polymeric salts caused the resultant free amine polymers to precipitate from the aqueous solutions, when the salts were polymerized at solid concentrations stated herein. Thus, it can be seen that the desired properties of high molecular weight and water solubility at relatively high polymer concentration can only both be achieved simultaneously by polymerizing the monomer in salt form and maintaining it as a solution in that chemical state.

EVALUATION OF THE INVENTION

In order to determine the efficacy of the high molecular weight polymers of the invention they were tested as paper process additives to determine their filler and fiber fines retention, dye retention and improvement of a sheet formed upon a foraminous surface. The polymeric chemicals were added to a paper pulp being processed by known methods to form a continuous sheet.

Most papers must have a finely ground filler added to them, the purpose of which is to occupy the spaces between the paper fibers thus giving a smooth surface, a more brilliant whiteness, improved printability and improved opacity. The fillers or inorganic substances may be either naturally occurring materials such as talc, agalite, pearl filler, barytes and certain clays such as china clay, or artificial fillers such as suitably precipitated calcium carbonate, crown filler (pearl hardening), blanc fixe and titanium dioxide pigments. However, in the absence of certain selected chemical additives the above added fillers and small fiber fines are not retained with the sheet mat actually formed via a Fourdrinier or cylinder machine. These materials rather are carried along with the water drained from the sheet network and are subsequently discarded or must be recovered in separate processes. This, of course, results in an uneconomical over-all process and to correct this situation a host of chemical additives have been incorporated with paper stock in order to improve filler and fine retentions in the paper manufacturing operation.

To determine the effectiveness of the high molecular weight polymers of the invention with regard to their filler and fine retentive activity in comparison to other prior art materials synthesized by known techniques, a procedure was devised known as the Phototester method. This involved a measurement of the light absorption of a supernatant liquid remaining after settling of a dispersion of pulp and titania. A blank was run and then compared to samples in which the high polymer retention aids of the invention had been previously added. The difference between the percent absorption of the blank sample and the percent absorption of the treated sample gives then a Phototester number. This number is directly related to the ability of the sample tested to act as a retention aid, with retention activity directly proportional to the increase in the Phototester number. The higher the number, then, the greater the retention activity. If, for example, a blank sample gives a 60% absorption and a treated sample a 40% absorption, the difference stated as an absolute number is 20, which then is the Phototester number. A typical apparatus which may be used in the above determination is the Nalco Phototester[1] Model SP whose operation and mechanism are described in Nalco Chemical Company Bulletin 56, entitled "Catalogue of Water Testing Equipment," page 7.

More specifically, this Phototester method is as follows: Bleached sulfite pulp is beaten for 30 minutes and added to the proportioner of a Noble & Wood sheet machine and the consistency adjusted to give a 0.21% pulp content. To this pulp slurry is added 75 mls. of TiO$_2$, which had been previously slurried in water to give a 5% suspension, to give an addon of 10%, based on the fiber weight. Alum is added in order to standardize the system in meeting normal paper mill procedure. The pulp furnish is then removed from the proportioner to a porcelain lined pail and stirred for one hour. Before stirring, the pH had been adjusted to 5.5 with a normal sulfuric acid solution. The pulp furnish, containing the titania and alum is then stirred for one-half hour and a sample of the supernatant liquid is taken and tested in the Phototester machine for light absorbency. The figure obtained, then, corresponds to the percent absorbency of a blank, that is, a pulp treated with titania filler and alum in which no retention aid has been added.

In order to evaluate the retention activity of the polymers of the invention, a 125 ml. sample of pulp containing alum and titanium is added to a 20 ounce jar. The retention aid is then added from a 0.02% solution and the entire mixture swirled briefly. 375 ml. of tap water is added, the jar is capped and inverted five times and allowed to stand for five minutes. The supernatant liquid is then removed and a Phototester measurement taken. In order to avoid aging of solutions which would result in a less meaningful determination, all of the above test solutions of titanium, alum and retention chemicals are freshly made each day; also, the titania suspension is never allowed to settle between the time it is made and the time it has been added to the pulp suspension.

Five samples of the acetate salt of polydimethylaminoethyl methacrylate were synthesized having viscosities, measured as a 25% by weight solution of solid polymer at 77° F., of 10,000; 12,000; 14,000; 16,000; and 18,000 centipoises respectively. These high molecular weight polymers showed excellent retention ability and had Phototester numbers of 30.4, 31.2, 31.6, 32.0 and 32.4, respec-

[1] Registered trademark of Nalco Chemical Company.

tively. The above figures point out the fact that performance of the high molecular weight polymers as fine and filler retention aids is directly proportional to their molecular weight as measured by solution viscosities. In contradistinction to this, the same polymer was prepared by known solution polymerization techniques without deaerating the reaction mixture and polymerization system. This polymer had a viscosity of 1,000 centipoises and correspondingly a Phototester factor of 23.8. This performance, of course, is substandard and use of this polymer as a retention aid in the paper industry would not be acceptable.

In addition to possessing excellent fiber and fines retention ability of a degree heretofore not available to the paper art, the high molecular polymers of the invention are not affected by other additives normally used in the paper processing operation such as rosins, size, alum, sodium aluminate, starch, clays and the like. Similarly, the ester-amine polymeric substances are not affected by the particular electro-kinetic charge on the cellulose fibers and fines and have no adverse affects on the finished sheet in which they are contained. In addition the polymers are relatively safe to handle and are capable of acting both on filler and fines in the system to efficiently cause such materials to be retained in the finished sheet rather than with one being preferentially acted upon by the polymeric additives. Also, these high molecular weight polymers are capable of operating on a large variety of stocks and do not interfere with the beneficial effects imparted to the paper stocks by coatings frequently placed thereon. Also, the high molecular weight retention aids of this invention can be employed in effective combinations with various fillers or other paper additives and have no adverse effects upon the finished paper product.

A very important property of the high molecular weight polymers in the invention is that while they do possess the required high linear chain link, they nevertheless have excellent solubility or dispersability in the paper pulp with the result that no localized non-uniform areas are noted. Also, use of these polymers as retention aids do not fail by promoting filler trappage on the top side of the fiber material.

The polymers in the invention may be used as retention aids for all fiber furnishes including both bleached and unbleached primary or virgin chemical pulps, mechanical pulps and secondary fibers, that is, fibers previously employed as paper stock. When employed in conjunction with any of the above stock the high molecular weight polymers show retention activity even at activity levels as low as 0.01 pound per ton based on the weight of dry fiber, and may be used in amounts ranging up to 10 pounds per ton. Excellent retention of fiber fines and fillers may be realized in both Fourdrinier and cylinder paper machine systems. Increased filler retention realized from the use of these high molecular weight compounds results in brighter sheets with better density, opacity and ash content. Also, better sheet formation, smoothness, printability and porosity and greatly reduced two-sidedness, that is, differences of such properties as color and brightening of the respective sheet sides due to uneven pigment retention, are noted when these amine-ester polymers are employed. In addition to the above advantages, use of the newly invented retention agent results in cleaner machine operations and a less abrasive system, reduced load to the saveall, and minimal sewer losses due to the decrease in tray and white water solids. A particular desirable result realized through the use of the polymers was a decrease in pinholes in the sheet with a resultant improved paper product. Retention activity of the polymers is somewhat improved through the use of alum, but it is understood, of course, that the high molecular weight compounds of the invention show excellent activity even in the absence of alum.

The polymers of the invention also have activity in improving drainage through the wire surface of the Fourdrinier machine. In many cases, a suitable retention aid nevertheless shows little or no activity in improving the drainage of white water from the pulp slurry. Oftentimes the converse is also true. That is, effective drainage aids exhibit poor retention activity. However, in the case of the instant invention, the high molecular weight polymeric compositions show an excellent activity in both fields of paper treatment. To improve both retention activity and drainage the polymers may be added to the fan pump, headbox, wire pit, etc., prior to actual formation of the paper sheet. It is preferred that when the water soluble polymers are to be used for retention and drainage improvement purposes, they be added after the fibers have been refined. The exact mechanism of retention activity and drainage improvement is not known, but it is believed that the fiber fines and filler are agglomerated upon the large fiber particles and thereby a sufficiently strong fiber mat is produced, which still has sufficient porosity to allow the white water to drain.

As opposed to many prior art water-soluble polymeric paper additives the high molecular weight polymers of the invention also find use as an additive in cellulosic materials for purpose of retaining dye added thereto. In the past, effective use of many polymeric materials has been limited to either employment as filler and fines retention aids or as dye retention aids and resort to two polymers or other substances had to be made to accomplish both tasks. The polymers described herein had surprisingly effective activity in both areas of improving paper process efficiency.

While the polymers of the invention are useful in retaining dyes added to cellulose derivative materials, such as cellulose acetate used in making yarns, threads, filaments, fibers and the like or fabrics made from any of the above, the polymers find special use in improving the affinity of paper pulp for dyestuffs. Particular effectiveness is shown when the polymers of the invention are used to retain acid and anionic dyes. To determine the effectiveness of the high molecular weight polyester-amine polymers the following tests were run:

*Experiment II*

The polymer of Experiment I was evaluated by adding same to a prepared handsheet to which was also added various acid dyes. The effectiveness of the polymer in retaining the dye upon the sheet was compared with that of a blank and also another cationic polymer used for the same purpose. To prepare the handsheet used in the evaluation the procedure was as follows: Bleached sulfite pulp was beaten to a Williams freeness of 50.0 seconds and the pulp dewatered to 25% consistency. 60 grams (oven dry basis) of this pulp was then slurried with the aid of a laboratory disintegrator in two liters of Chicago tap water. The pulp slurry was then diluted to a total volume of 6 liters. Samples of 250 ml. of this slurry were then removed for chemical additions prior to sheet preparation. This quantity of pulp yields a 2.5 gram handsheet which on the British sheet mold is equivalent to a basis weight of 77.5 pounds/ream (24" x 36"–500 sheets). The sheets were then formed, couched and pressed between three standard blotters on a Noble & Wood press and then dried using 6 passes on the Noble & Wood dryer. The sheets treated with the high molecular weight polymer of the invention had much brighter colors than those sheets formed in conjunction with use of the prior art cationic material. Also, the polyester-amine high molecular weight polymer had a greater degree of color retention, as indicated by the greater color depth, than the blank or treatment involving no addition of dye retention aid. The above was true with samples treated with both Bond Blue H acid and Canary G acid dye.

The cationic polymers of the invention find their peak effectiveness when used as retention additives for both anionic and acid dyes. It has been found, for example, that as little as 0.1% of polymer per ton of paper pulp will improve the dye retention of paper and/or cellulosic cloth to some extent. The upper limit of the concentration range is dependent upon economic considerations. As much as 5 and even 10 pounds per ton of paper pulp, for example, can be used but such quantities often are uneconomical.

Improved results are obtained when the retention aid is added to the cellulosic material prior to contacting the product with dye. If it is desirable however, the retention aid can also be added after contact has been made between the dye and the cellulosic fibers.

While molecular weight is not considered quite as critical in ability to retain dyestuffs as it is considered in retaining inorganic mineral fillers and fiber fines, nevertheless it is shown that for most effective results, higher molecular weight materials, in the case of the polymers of the invention, show most promise.

As mentioned above, samples of high molecular weight polyester-amine compounds have been prepared which have viscosities even as high as 100,000 centipoises when measured at 77° F. as aqueous solutions containing 2.5% by weight of polymeric solids. However, for best handling and additive use in commercial and industrial processes, polymers within the range of 8,500 centipoises and 20,000 centipoises have been found most effective.

All viscosity measurements described herein were made using a Brookfield viscometer Model LVF.

The invention is hereby claimed as follows:

1. A process for the preparation of a high molecular weight polymeric salt which contains repeating monomeric units of the following structure:

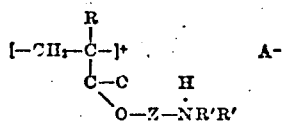

where R is selected from the group consisting of hydrogen, methyl and ethyl, Z is selected from the group consisting of $-(CH_2)_2-$, $-(CH_2)_3-$ and $$-CH_2CH(CH_3)-$$

R' is selected from the group consisting of hydrogen and lower alkyl radicals containing not more than 6 carbon atoms and A is the anion of an ionizable acid capable of salt formation; which comprises the steps of forming a reaction mixture of an aqueous solution containing 10–40% by weight of an ethylenically unsaturated monomeric salt corresponding to said structural formula, bringing said reaction mixture to boiling under reduced pressure and at a temperature ranging from 40° C. to 80° C. to remove dissolved oxygen therefrom, adding from about 0.001% to about 0.2% by weight of a peroxidic polymerization catalyst to said reaction mixture to initiate polymerization, and completing polymerization by maintaining said temperature range of said monomeric salt solution in the presence of an inert gas until the viscosity of said aqueous polymeric solution reaches at least 8,000 centipoises measured at 77° F. as an aqueous solution containing 25% solids by weight, and terminating said polymerization prior to gel formation by addition of a chemical acting as a polymer chain-stopper.

2. The process of claim 1 wherein said chemical is ammonium thioglycolate.

3. The process of claim 1 wherein said monomeric salt is dimethylaminoethyl methacrylate acetate.

4. A process for the preparation of a high molecular weight polymeric salt which contains repeating monomeric units of the following structure:

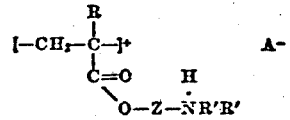
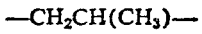

where R is selected from a group consisting of hydrogen, methyl and ethyl, Z is selected from a group consisting of $-(CH_2)_2-$, $-(CH_2)_3-$ and $$-CH_2CH(CH_3)-$$

R' is selected from the group consisting of hydrogen and lower alkyl radicals containing not more than 6 carbon atoms and A is the anion of an ionizable acid capable of salt formation; which comprises the steps of forming a reaction mixture of an aqueous solution containing 10–40% by weight of an ethylenically unsaturated monomeric salt corresponding to said structural formula, bringing said reaction mixture to boiling under reduced pressure and at a temperature ranging from 40° C. to 80° C. to remove dissolved oxygen from said reaction mixture, adding from about 0.001 to about 0.2% by weight of a peroxidic polymerization catalyst based on the weight of said reaction mixture and 0.003% to about 3.0% by weight of a catalyst activator based on the weight of the reaction mixture to initiate polymerization, completing polymerization by maintaining said temperature range of said monomeric salt solution in the presence of an inert gas until the viscosity of said aqueous polymeric solution reaches at least 8,000 centipoises measured at 77° F., as an aqueous solution containing 25% solids by weight, and terminating said polymerization prior to gel formation by addition of a chemical acting as a polymeric chain stopper.

5. The process of claim 4 wherein said polymer chain stopper is ammonium thioglycolate.

6. The process of claim 5 wherein said ethylenically unsaturated monomeric salt is dimethylaminoethyl methacrylate acetate.

References Cited by the Examiner
UNITED STATES PATENTS

| | | | |
|---|---|---|---|
| 2,204,517 | 6/1940 | Strain | 260—89.5 |
| 2,471,959 | 5/1949 | Hunt | 260—89.5 |
| 2,723,256 | 11/1955 | Hayek | 260—89.7 |
| 2,765,229 | 10/1956 | McLaughlin | 162—168 |
| 2,838,397 | 6/1958 | Gruntfest et al. | 162—168 |
| 2,964,445 | 12/1960 | Daniel | 162—168 |
| 3,099,636 | 7/1963 | Skiles | 260—89.5 |

JOSEPH L. SCHOFER, *Primary Examiner.*

M. O. WOLK, DONALD CZAJA, *Examiners.*